United States Patent
Pedersen

(10) Patent No.: US 6,438,598 B1
(45) Date of Patent: *Aug. 20, 2002

(54) SYSTEM AND METHOD FOR TRANSMITTING DATA FROM A SERVER APPLICATION TO MORE THAN ONE CLIENT NODE

(75) Inventor: Bradley J. Pedersen, Parkland, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/311,158

(22) Filed: May 13, 1999

Related U.S. Application Data

(63) Continuation of application No. 08/856,051, filed on May 14, 1997, now Pat. No. 5,941,949.

(51) Int. Cl.$^7$ .............................................. G06F 15/16
(52) U.S. Cl. ........................ 709/227; 709/238; 709/203
(58) Field of Search ................................ 709/227, 238, 709/203, 230, 249, 250, 217

(56) References Cited

U.S. PATENT DOCUMENTS 4,499,499 A    2/1985   Brickman et al. .......... 358/263

(List continued on next page.)

FOREIGN PATENT DOCUMENTS

EP    0 381 645    8/1990

(List continued on next page.)

OTHER PUBLICATIONS

Holtzman, Jeff. "Merge 386: Run Unix and DOS together on an 80386," *Byte*, pp. Cover sheet, 207–208, 211–212, (Dec., 1988).

(List continued on next page.)

*Primary Examiner*—Zarni Maung
(74) *Attorney, Agent, or Firm*—Testa, Hurwitz & Thiebeault, LLP

(57) ABSTRACT

The invention relates to a system and method for transmitting the same data to more than one client node substantially simultaneously. In one embodiment the invention relates to a method for transmitting the same data substantially simultaneously from an application executing on a server node to at least two client nodes. The method includes the steps of providing a connection between a first client node and a first client protocol stack and between the application and the first client protocol stack; associating a first minimal communications protocol stack with the first client protocol stack; providing a connection between the application and the first minimal communications protocol stack and between a second client node and a second client protocol stack; associating a second minimal communications protocol stack with the second client protocol stack; providing a connection between the first minimal protocol stack and the second minimal protocol stack; and between the second minimal protocol stack and said the client protocol stack. The method then transmits data from the application program to the first client protocol stack and the first minimal protocol stack substantially simultaneously.

The invention also relates to a communication system including a server node including: an application program, a first client protocol stack in electrical communication with the application program, a first minimal protocol stack in electrical communication with the application program; a second minimal protocol stack in electrical communication with the first minimal protocol stack; and a second client protocol stack in electrical communication with the second minimal protocol stack.

13 Claims, 7 Drawing Sheets

U.S. PATENT DOCUMENTS

| | | | |
|---|---|---|---|
| 4,887,204 A | 12/1989 | Johnson et al. | 364/200 |
| 4,937,784 A | 6/1990 | Masai et al. | 364/900 |
| 5,014,221 A | 5/1991 | Mogul | 364/519 |
| 5,031,089 A | 7/1991 | Liu et al. | 364/200 |
| 5,175,852 A | 12/1992 | Johnson et al. | 395/600 |
| 5,202,971 A | 4/1993 | Henson et al. | 395/425 |
| 5,233,701 A | 8/1993 | Nakata | 395/425 |
| 5,249,290 A | 9/1993 | Heizer | 395/650 |
| 5,325,527 A | 6/1994 | Cwikowski et al. | 395/650 |
| 5,329,619 A | 7/1994 | Page et al. | 395/200 |
| 5,341,477 A | 8/1994 | Pitkin et al. | 395/200 |
| 5,341,478 A | 8/1994 | Travis, Jr. et al. | 395/200 |
| 5,367,688 A | 11/1994 | Croll | 395/700 |
| 5,414,457 A | 5/1995 | Kadowaki et al. | 348/14 |
| 5,473,599 A | 12/1995 | Li et al. | 370/16 |
| 5,485,460 A | 1/1996 | Schrier et al. | 370/94.1 |
| 5,499,343 A | 3/1996 | Pettus | 395/200.2 |
| 5,515,508 A | 5/1996 | Pettus et al. | 395/200.01 |
| 5,526,492 A | 6/1996 | Ishida | 395/200.09 |
| 5,530,852 A | 6/1996 | Meske, Jr. et al. | 395/600 |
| 5,537,546 A | 7/1996 | Sauter | 395/200.01 |
| 5,548,726 A | 8/1996 | Pettus | 395/200.09 |
| 5,553,242 A | 9/1996 | Russell et al. | 395/200.12 |
| 5,557,732 A | 9/1996 | Thompson | 395/161 |
| 5,557,748 A | 9/1996 | Norris | 395/200.1 |
| 5,561,769 A | 10/1996 | Kumar et al. | 395/200.05 |
| 5,572,643 A | 11/1996 | Judson | 395/793 |
| 5,572,674 A | 11/1996 | Ernst | 395/200.1 |
| 5,579,469 A | 11/1996 | Pike | 395/326 |
| 5,583,992 A | 12/1996 | Kudo | 395/200.03 |
| 5,596,745 A | 1/1997 | Lai et al. | 395/614 |
| 5,606,493 A | 2/1997 | Duscher et al. | 364/134 |
| 5,623,656 A | 4/1997 | Lyons | 395/610 |
| 5,644,720 A | 7/1997 | Boll et al. | 395/200.12 |
| 5,657,390 A | 8/1997 | Elgamal et al. | 380/49 |
| 5,680,549 A | 10/1997 | Raynak et al. | 395/200.12 |
| 5,701,451 A | 12/1997 | Rogers et al. | 395/600 |
| 5,706,437 A | 1/1998 | Kirchner et al. | 395/200.12 |
| 5,710,918 A | 1/1998 | Lagarde et al. | 395/610 |
| 5,721,876 A | 2/1998 | Yu et al. | 395/500 |
| 5,734,865 A | 3/1998 | Yu | 395/500 |
| 5,754,830 A | 5/1998 | Butts et al. | 395/500 |
| 5,761,507 A | 6/1998 | Govett | 395/684 |
| 5,764,908 A | 6/1998 | Shoji et al. | 395/200.47 |
| 5,764,915 A | 6/1998 | Heimsoth et al. | 395/200.57 |
| 5,802,258 A | 9/1998 | Chen | 395/182.08 |
| 5,802,306 A | 9/1998 | Hunt | 395/200.58 |
| 5,812,784 A | 9/1998 | Watson et al. | 395/200.57 |
| 5,826,027 A | 10/1998 | Pedersen et al. | 395/200.51 |
| 5,828,840 A | 10/1998 | Cowan et al. | 395/200.33 |
| 5,838,906 A | 11/1998 | Doyle et al. | 395/200.32 |
| 5,838,910 A | 11/1998 | Domenikos et al. | 395/200.33 |
| 5,838,916 A | 11/1998 | Domenikos et al. | 395/200.49 |
| 5,918,018 A * | 6/1999 | Gooderum et al. | 709/225 |
| 5,938,733 A | 8/1999 | Heimsoth et al. | 709/230 |
| 5,941,949 A | 8/1999 | Pedersen | 709/227 |
| 5,941,988 A | 8/1999 | Bhagwat et al. | 713/201 |
| 5,951,694 A | 9/1999 | Choquier et al. | 714/15 |
| 5,961,586 A | 10/1999 | Pedersen | 709/201 |
| 5,978,848 A | 11/1999 | Maddolozzo, Jr. et al. | 709/227 |
| 6,085,247 A * | 7/2000 | Parsons, Jr. et al. | 709/227 |
| 6,157,944 A | 12/2000 | Pedersen | 709/204 |

FOREIGN PATENT DOCUMENTS

| | | |
|---|---|---|
| EP | 0 384 339 | 8/1990 |
| EP | 0483576 A2 | 5/1992 |
| EP | 0 540 151 A2 | 5/1993 |
| EP | 0 648 038 | 4/1995 |
| EP | 0732834 A2 | 9/1996 |
| JP | 06332782 | 12/1994 |
| WO | WO 98/52320 | 11/1998 |
| WO | WO98/52344 | 11/1998 |

OTHER PUBLICATIONS

Tessier, Tom. "Using Javascript to Create Interactive Web Pages: A Cross–Platform Object Scripting Language," *Dr. Dobb's Journal*, vol. 21, No. 3, pp. 84–97, (Mar., 1996).

Davis, Philip. "An Interactive Hypermedia Map Viewer," *Database*, vol. 18, No. 2, pp. 65–67, (Apr./May, 1995).

Chu, Josey M. et al. "Creating a Hypertext Markup Language Documents for an Information Server," *Behavior Research Methods, Instruments & Computers*, vol. 27, No. 2, pp. 200–205, (Jan. 1, 1995).

van Hoff, Arthur. "Java and Internet Programming," *Dr. Dobb's Journal*, pp. 56, 58, 60–61, 101–102, (Aug., 1995).

Putz, Steve. "Interactive Information Services Using Word–Wide Web Hypertext," *Computer Networks and ISDN Systems*, Elsevier Science B.V., vol. 27, pp. 273–280, (1994).

The Animator Applet (1.0.2)—example 1, http://199.185.96.71/java/Animator/example.html, printed May 1, 1999.

Andrew S. Tanenbaum, *Computer Networks*, Second Edition, Chapter 6 "Networking In Unix," pp. 434–435, Prentice Hall P T R, Englewood Cliffs, New Jersey.

Droms, R., "Dynamic Host Configuration Protocol", *Network Working Group Request for Comments*: 1541, Oct. 1993, pp. 1–39.

"OS/2 EE Database Manager SQLJRA Remote Protocol", *IBM Technical Disclosure Bulletin*, vol. 36, No. 1, Jan. 1993, pp. 33–36.

"Allocation of Equivalent Communication Buffer Sizes in SQLJRA Remote Protocol", *IBM Technical Disclosure Bulletin*, vol. 36, No. 1, Jan. 1993, pp. 29–31.

Mann, Bruce E. et al., "Terminal Servers on Ethernet Local Area Networks", *Digital Technical Journal*, No. 3, Sep. 1986, pp. 73–87.

*Windows NT Networking Guide: Microsoft Windows NT Resource Kit*, Microsoft Press 1995, pp. 79–87.

Schemers, R.J., *Update*, Sep. 17, 1995, pp. 1–5.

Singleton, A.; *Byte*; "Wired On The Web"; (Jan. 1, 1996), pp. 77–78, 80.

"Distributed Coordination Models for Client/Server Computing," Richard M. Adler, Apr. 1995 Computer Magazine, pp. 14–22.

* cited by examiner

SYSTEM AND METHOD FOR TRANSMITTING DATA FROM A SERVER APPLICATION TO MORE THAN ONE CLIENT NODE

RELATED APPLICATION

This application is a continuation of U.S. patent application "System And Method For Transmitting Data From A Server Application To More Than One Client Node," Ser. No. 08/856,051 filed May 14, 1997, now U.S. Pat. No. 5,941,949.

FIELD OF THE INVENTION

The present invention relates generally to a system and method for communicating between a server application and multiple client nodes and more specifically to a system and method for transmitting the same data to more than one client node substantially simultaneously.

BACKGROUND OF THE INVENTION

Shadowing (transmitting data destined for one client node substantially simultaneously to a second client node) and broadcasting (transmitting the same data substantially simultaneously to more than one client node) typically has been performed using a specialized transmitting application on a server node and specialized receiver applications on each of the client nodes. Shadowing is useful in monitoring data traffic and for creating a redundant copy of information being transmitted for data integrity and system security purposes. Broadcasting is useful in providing the same information to many users, when such information is "real-time" or when the information does not have a per se beginning or ending. For example, a stock price quotation program simply transmits the current prices of various stocks on a given exchange and the list repeats with the latest prices once the list of stocks is exhausted. Thus it is irrelevant to a user that he or she does not specify to the quotation program where to begin the list Such programs typically are written with a broadcast program in mind and require specialized receiver programs to receive the data transmitted. If an application has not been written as a broadcast program, the data transmitted by such an application can not typically be broadcast to multiple client nodes.

The present invention attempts to overcome this problem by permitting programs not written for broadcast functionality to be used to broadcast data over a network.

SUMMARY OF THE INVENTION

The invention relates to a system and method for transmitting the same data to more than one client node substantially simultaneously. In one embodiment the invention relates to a method for transmitting the same data substantially simultaneously from an application executing on a server node to at least two client nodes executing a generalized receiver program. The method includes the steps of establishing a connection between a first client node and a first client protocol stack on the server node; establishing a connection between the application executing on the server node and the first client protocol stack; associating a first minimal communications protocol stack with the first client protocol stack; establishing a connection between the application executing on the server node and the first minimal communications protocol stack; establishing a connection between a second client node and a second client protocol stack on the server node; associating a second minimal communications protocol stack with the second client protocol stack; providing a connection between the first minimal protocol stack and the second minimal protocol stack; providing a connection between the second minimal protocol stack and said the second client protocol stack; and transmitting data from the application program to the first client protocol stack and the first minimal protocol stack, substantially simultaneously.

The invention also relates to a communication system including a server and two or more client nodes. In one embodiment the server node comprises an application program; a first client protocol stack in electrical communication with the application program; a first minimal protocol stack in electrical communication with the application program; a second minimal protocol stack in electrical communication with the first minimal protocol stack; and a second client protocol stack in electrical communication with the second minimal protocol stack. In addition the system includes a first client node in electrical communication with the first client protocol stack and a second client node in electrical communication with the second client protocol stack. Data from the application program is transmitted to the client protocol stack and the first minimal protocol stack substantially simultaneously.

BRIEF DESCRIPTION OF THE DRAWINGS

The foregoing and other objects, features and advantages of the invention will become apparent from the following more particular description of preferred embodiments of the invention, as illustrated in the accompanying drawings.

DETAILED DESCRIPTION OF THE INVENTION

Figure 1:
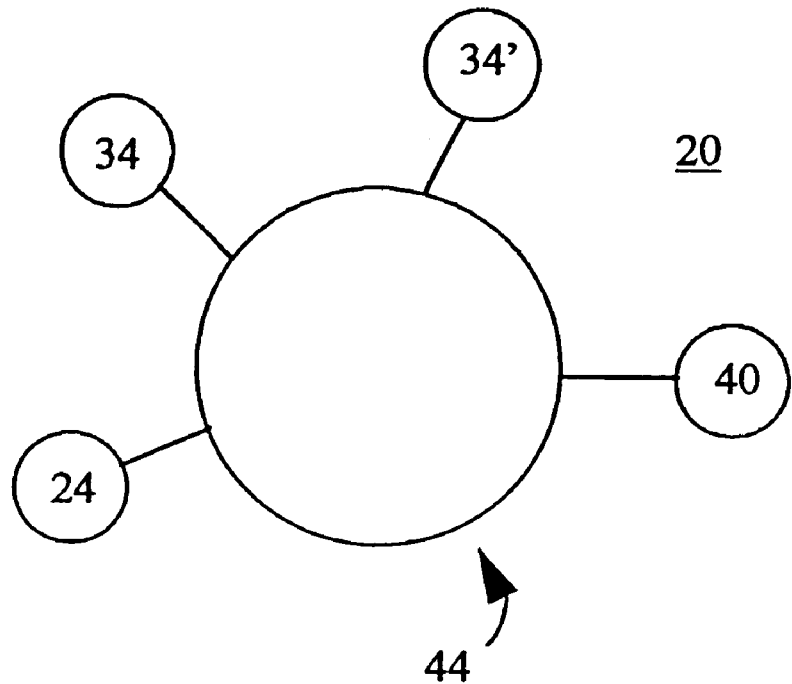
FIG. 1 is a highly schematic diagram of an embodiment of a communication system utilizing the invention.

Referring now to FIG. 1, in brief overview, a typical network 20 includes at least one client node 24, at least one server node 34, 34', and a master network information node 40 connected together by a communications link 44. The embodiment shown in FIG. 1 depicts the communications link 44 as a local area network ring or LAN ring, but any communication topology may be used. For the purpose of explanation the server node 34 is assumed to have the application requested by the client node 24. Also, for the purpose of explanation, the master network information node 40 is assumed to be a distinct server node, but in actuality the master network information node 40 may be an application execution server node 34. It should be noted that on a given LAN several nodes may be capable of acting as a network information node, but at any one time only one of such nodes is designated the master network information node 40 for the system 20 and it is to this node that client requests for server information are directed.

The master network information node 40 maintains a table of addresses for the application execution server nodes 34, 34'. In addition, the master network information node 40 receives messages from each application execution server node 34, 34' indicating its level of activity. The level of activity of the application execution server nodes 34, 34' is maintained in a table along with the address of each of the application execution server nodes 34 and is used by the communications system 44 for load leveling.

When the client 24 wishes to have an application executed on an application execution server node 34, the client node 24 sends a request to the general communications port previously defined by the communications protocol or to the "well-known" communications port on the master network information node 40. In one embodiment the communication takes place by way of a datagram service. The master network information node 40 accesses the table of server addresses and returns a message containing the address of the application execution server or lo application server 34 which has the requested application and also which has the least load. Subsequent communications are automatically addressed by the client also to a "well-known" or predefined general communications port on the server node 34. In one embodiment, the type of protocol with which the initial query was made to the master network information node 40 determines the protocol of the information returned by the master network information node 40 to the client node 24. Thus if the request were made using a TCP/IP datagram, the master network information node 40 would return the TCP/IP address of the server 34 to the client node 24 and the client node 24 would subsequently establish contact with the server node 34 using that protocol. In another embodiment, the datagram requesting an application address by a client 24 includes a request for a different type of protocol than the one used to send the request to the master network information node 40. For example, the client 24 may make a request to the master network information node 40 using the IPX protocol and request the address of the application server as a TCP/IP protocol address.

When a client node 24 (actually a client process 56 on a client node 24) desires to communicate with an application on a server node 34, 34' the client node 24 begins by issuing a network request to determine the location of the server 34 having the desired application. This request is received by the master network information node 40 (also referred to as a network browser 40) residing somewhere on the network. In this FIG. 1, the network browser 40 is shown for simplicity as residing on a different server 40 from the server which has the application, but such may generally not be the case.

The master network information node 40 returns the network address of the server node 34 having the desired application to the client node 24. The client node 24 then uses the information received from the master network information node 40 to request connection to the application executing on the specified server 34. As is described above, such a connection is first established to a "well-known" communications port and is later transferred to a specific communications port under control of a connection manager. The specific communications port is associated with the application executing on the server node 34 which then communicates with the client node 24 through the specific communications port.

Figure 2:
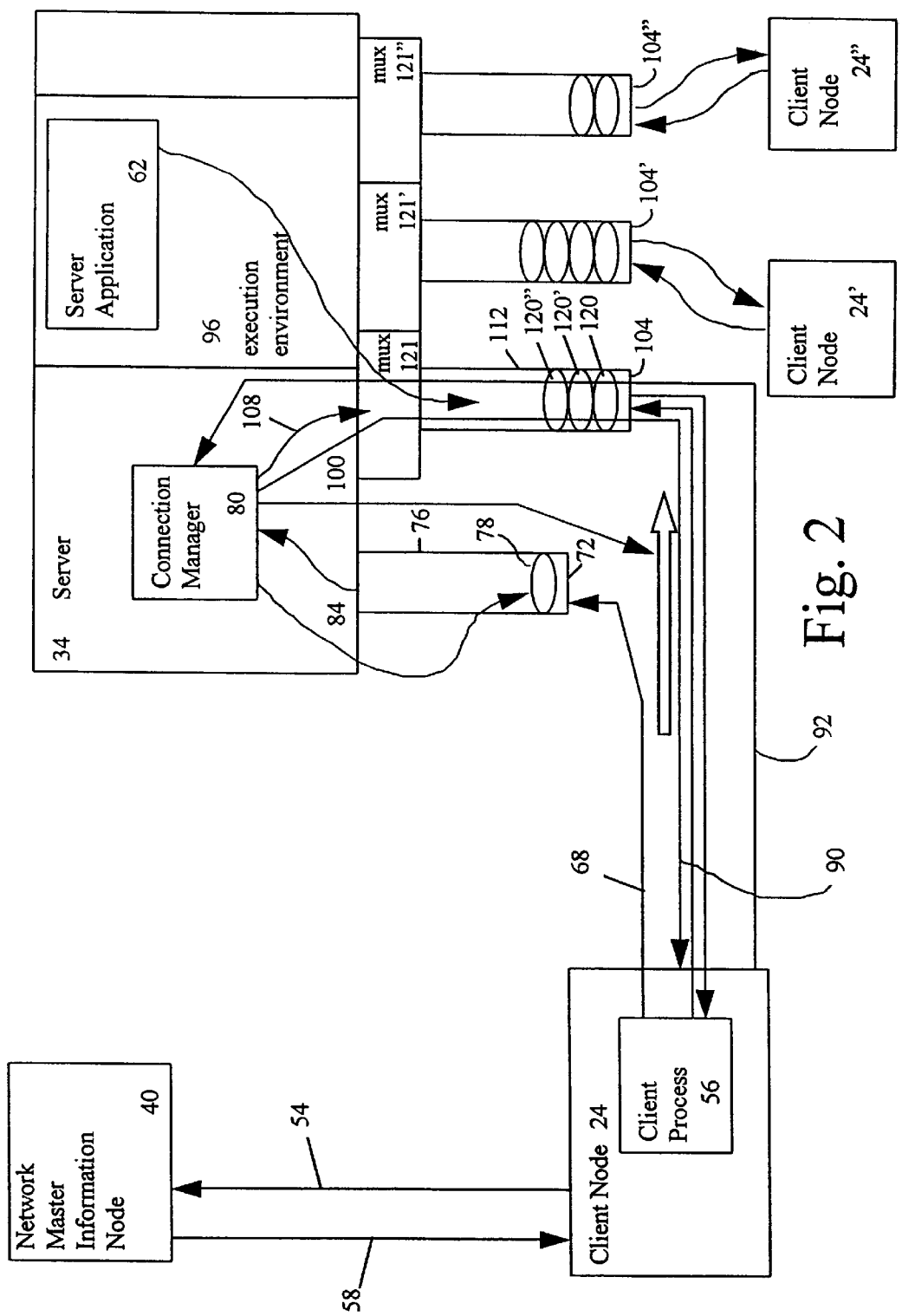
FIG. 2 is a block diagram of an embodiment of the invention showing the connections between various components of the server of FIG. 1 which occur during communication between the clients and server.

In more detail, and referring to FIG. 2, the client process 56 on client node 24 makes a request 54 to the master network information node 40 to obtain the address of a server node 34 which includes the desired application 62. The master network information node 40 returns to the client node 24 a message 58 containing the address of the server node 34 which includes the server application 62. In one embodiment, the protocol used at this point of the connection is a datagram service.

The client node 24 uses the returned address to establish a communication channel 68 with the server 34. The port number used by the client 24 corresponds to the "well-known port" in the server 34 which has been defined by the network protocol as the port by which the server 34 establishes communication connections with clients 24. The well-known port 72 has a rudimentary protocol stack 76 which includes primarily an end point data structure 78.

The end point data structure 78 points to the communication protocol stack 76 and client connection thereby establishing a unique representation or "handle" for the client 24. The end point data structure 78 permits the connection between the server 34 and the client 24 to be moved at will between the connection manager 80 and the various applications 62 on the server 34. The end point data structure 78, in one embodiment, not only contains the handle to the client 24 but may also contain other information relating to the client connection. In the embodiment shown, the application server 34 monitors activity on a specific communications system (e.g. LAN or WAN) and has initialized this minimum protocol stack 76 with only the necessary protocol modules needed to support a "TTY" communication mode. The "TTY" communication mode is a simple ASCII stream with no protocol assumptions above the transport layer. That is, there are no protocol layers for compression, encryption, reliability, framing, or presentation of transmitted data. Thus a client node 24 seeking an application 62 running on the server 34 establishes a connection to the well-known communications port 72 with the minimum protocol set needed to support a TTY communication mode.

A connection manager 80 executing on the server node 34 is "listening" to the well-known communications port 72 for a connection request 68. When a connection request 68 is received from the client node 24, the connection manager 80 is notified 84. The connection manager 80 knows which protocol is being used based on the notification 84.

With this information the connection manager 80 creates a new minimum protocol communications stack 104, starts the execution environment 96 and binds the new minimum protocol stack 104 to the execution environment 96. In one embodiment, the server 34 includes a number of execution environments 96 which have been previously been started, but which have not been associated with a communications port. In this embodiment, the pre-connection starting of the execution environments permits a faster response time than if each execution environment 96 is started when the connection request is received from the client 24. When the execution environment 96 is started, the server application 62 requested by the client 24 is also started. In another embodiment, if the client 24 does not specify an application, either a default application is started or simply the execution environment 96 with no application is started.

The connection manager 80 then moves the client connection, including the unique client identifier or handle, from the well-known port 72 to the new minimum protocol stack 104. The connection manager 80, using the minimum protocol stack sends a TTY data stream that indicates service is available. Thus, this method for detecting a client connection is independent of the port to which the connection is first established. If the client node 24 does not respond within a prescribed time period (e.g. 5 seconds) to the service available message, a resends of the "service available" message is performed by the server 34.

If the client 24 receives the message, the client 24 sends a TTY string indicating that the "service available" message was detected. The client 24 waits for the server 34 to respond and if the response is not within a prescribed time interval (e.g. 5 seconds) the client 24 resends the message. The connection manager 80 then queries 90 the client 24 asking for the client's default communication parameters. This query 90 takes the form of a message which is passed back to the client 24 and which indicates that the client 24 should respond with details regarding what protocols the client 24 would like to use in the connection.

In response, the client 24 sends a set of protocol packets 92; each packet of which is used to specify a required or optional protocol module that is being requested from the server 34. In one embodiment, the number of packets in the set is variable with one packet being sent for each protocol requested. In another embodiment, the number of packets that is being sent is included in the header of the first packet. In a third embodiment, the remaining number of packets being sent is included in the header of each packet and is decremented with each succeeding packet sent. Thus, the client 24 may respond to the query 90 by indicating that, for example, encryption and data compression will be used. In such a case, two protocol packets will be sent from the client 24 to the server 34 and, in one embodiment, the header of the first packet will indicate the number of packets as two.

Once the responses to the query 90 have been received, the connection manager 80 builds a protocol stack using protocol drivers 120, 120', 120" which correspond to the protocols requested by the client node 24. In one embodiment, the connection manager 80 places each of the required protocol drivers 120, 120', 120", corresponding to the requested client protocols (e.g. an encryption driver if encryption is desired by the client) into the protocol stack "container" 112 and links them together. This dynamic process allows a client node 24 to specify the contents of a protocol stack dynamically without requiring that the server 34 have a prior protocol stack description for a particular client node 24. Using this method, multiple clients 24 may be served by a single server, even if the separate clients 24 have vastly differing requirements for the associated communications channel. In the embodiment shown, each client 24, 24', 24" is associated with a respective communications protocol stack 104, 104' and 104". Such dynamically extensible protocol stacks are described in more detail below and in U.S. patent application Ser. No. 08/540,891, filed on Oct. 11, 1995 and incorporated herein by reference.

In the embodiment just discussed, the "container" 112 is a user level or kernel level device driver, such as an NT device driver. This container driver provides ancillary support for the inner protocol modules or "drivers" (generally 120) which correspond to the protocol requirements of the client node 24. This ancillary support is in the form of helper routines that, for example, aid one protocol driver to transfer data to the next driver. Alternatively, in another embodiment each protocol driver is a complete user-level or kernel-level driver in itself.

Figure 3:
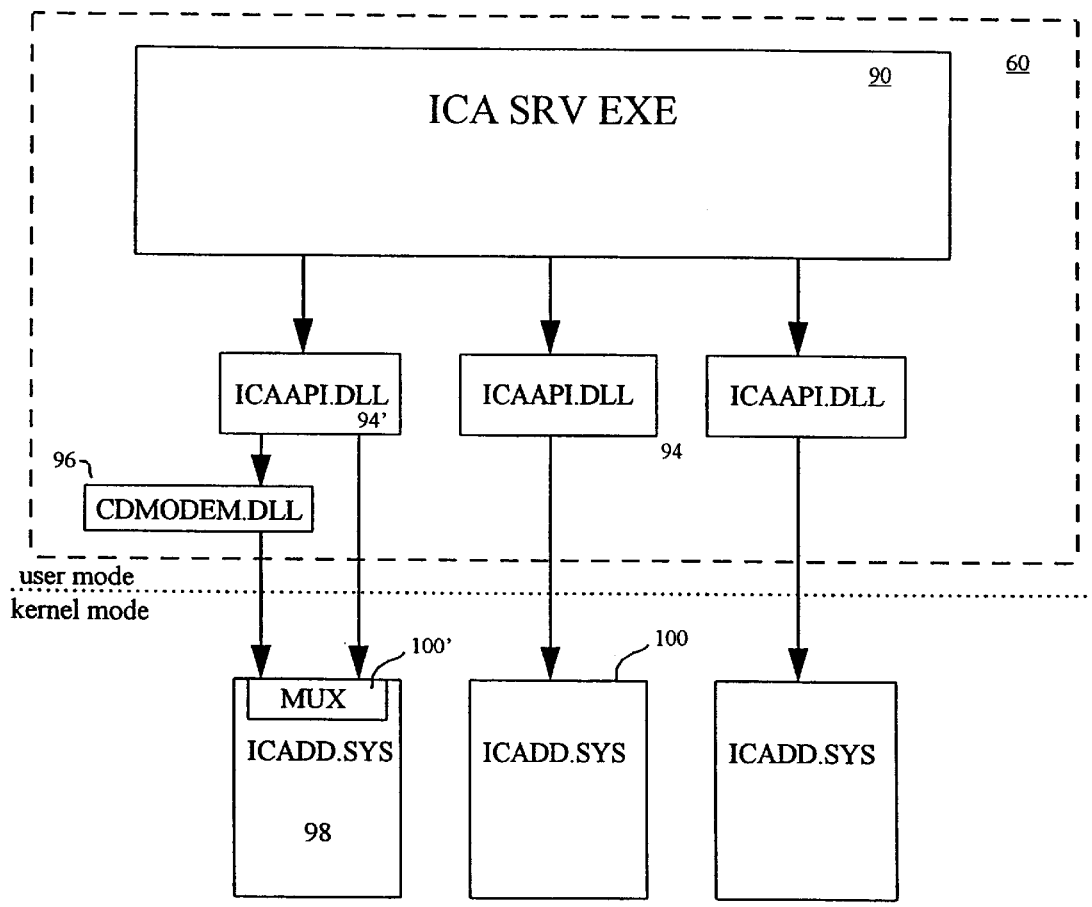
FIG. 3 is a block diagram of an embodiment of the invention that maintains and manages multiple client node connections.

Referring now to the embodiment depicted in FIG. 3, the connection manager 80 includes two main software modules: ICASRV.EXE 90 and ICAAPI.DLL 94. In the embodiment shown, ICASRV.EXE 90 is the server side of a client/server interface. ICASRV.EXE 90 manages all communications states and is, in one embodiment, implemented as a WINDOWS NT™ service. A second part of the connection manager 80 is ICAAPI.DLL 94. ICAAPI.DLL 94 establishes the connection with the client, establishes the protocols to be used and notifies ICASRV.EXE 90 of the completion of the protocol stack. In one embodiment, a third module CDMODEM.DLL 96 is linked to ICAAPI.DLL 94'. CDMODEM.DLL 96 is a module which ICAAPI.DLL 94' uses to communicate with modem devices.

The connection methodology described above can be used for a client 24 running a Web browser program. For the purposes of this specification, the user running the Web browser program will be referred to as the "viewing user." The terms "server" or "server node" will be used to refer to machines hosting HTML files or applications that may be executed. For example, a viewing user runs a Web browser on a client node and makes file requests via the HTTP protocol to servers. The servers respond by transmitting file data to the client via the HTTP protocol. The Web browser run on the client receives the transmitted data and displays the data as an HTML page to the viewing user.

Figure 4:
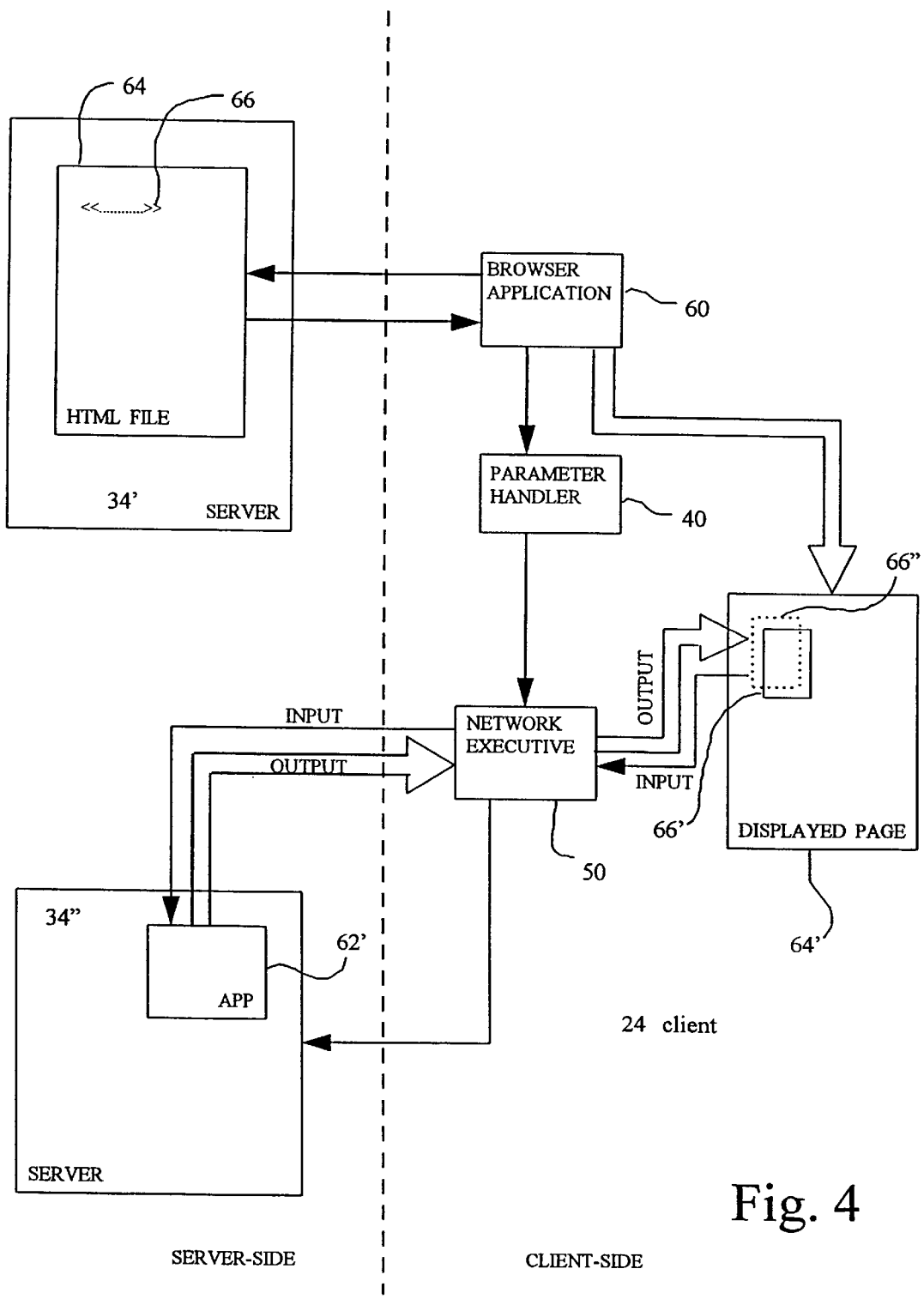
FIG. 4 is a block diagram of an embodiment of the system for embedding applications in an HTML page.

In brief overview and referring to FIG. 4, an HTML file 64 located on a server 34' and constructed in accordance with an embodiment of the invention includes a generic embedded window tag 66. The generic embedded window tag 66 is any data construct which indicates to a browser 60 displaying the HTML file 64 that a generic embedded window 66' should be displayed at a particular location in the HTML page 64' described by the HTML file 64. The generic embedded window tag 66 may include additional information, such as height of the window, width of the window, border style of the window, background color or pattern in the window, which applications may be displayed in the window, how often the output display should be updated, or any other additional information that is useful to enhance display of the application output.

Some examples of generic embedded window tags that can be embedded in an HTML file follow.

ActiveX tag

<object classid="clsid:238f6f83-b8b 4-11cf-8771-00a024541 ee3"
        data="/ica/direct.ica" CODEBASE="/cab/wfica.cab"
        width=436 height=295>
        <param name="Start" value="Auto">
        <param name="Border" value="On">
    </object>

Netscape Plugin tag

<embed src="http://www.citrix.com/ica/direct.ica"
        pluginspage="http://www.citrix.com/plugin.html"
        height=295 width=436 Start=Auto Border=On>
    <embed>

JAVA tag

<applet code=JICA.class width=436 height=295>
        <param name=Address value="128.4.1.64">
        <param name=InitialProgram value=Microsoft Word 7.0>
        <param name=Start value=Auto>
        <param name=Border value=On>
    </applet>

In each case above, the tag indicates that a window having a height of 295 pixels and a width of 436 pixels should be drawn to receive application output. Each tag also specifies that the application should automatically start execution and that the window in which the application output is displayed should be drawn with a border. The ActiveX and Netscape Plugin tags have the remote application parameters specified in the file "direct.ica" located in the directory "/ica." The JAVA tag specifies the remote application parameters directly. In the example above, the address of the server hosting the application is specified as well as the name of the application to be executed.

The browser application 60 accesses the HTML file 64 by issuing a request to a specific Uniform Resource Locator (URL) address. The server 34' hosting the HTML file 64 transmits the HTML file 64 data to the browser application 60, which displays text and translates any tags that are included in the HTML file 64. The browser application 60 displays the HTML file 64 data as an HTML page 64'. If a generic embedded window tag 66 is present in the HTML file 64, such as one of the tags described above, the browser 60 draws a blank window 66' in the displayed HTML page 64'.

Execution of the desired application 62' may commence immediately upon display of the HTML page 64' or execution may await some signal, e.g. a specified user input which indicates execution of the application 62' should begin. Once execution of the application 62' is commenced, the browser application 60 instantiates a parameter handler 40 associated with the application window 66'. The parameter handler 40 instance may be spawned as a child process of the browser application 60, as a peer process of the browser application 60, or as a Dynamically Linked Library ("DLL") associated with the browser application 60.

The browser application 60 passes any specific parameters associated with the application window 66' that were provided by the generic embedded window 66 tag to the parameter handler 40 instance. Additionally, the browser application 60 may pass the handle for the application window 66' to the parameter handler 40 instance or the parameter handler 40 instance may query the browser application 60 to retrieve the handle for the application window 66'. The parameter handler 40 instance also spawns a network executive 50. The network executive 50 may be spawned as a child process of the parameter handler 40 instance or as a peer process of the parameter handler 40 instance.

The parameter handler 40 instance forwards any specified application window 66' parameters to the network executive 50. Parameters which are not specified by the parameter handler 40 instance or the embedded generic window tag 66 may be set to default values. The network executive 50 may have certain parameter defaults hard-coded, or the network executive 50 may access a file which contains parameter defaults.

The network executive 50 creates its own application output window 66". The network executive 50 creates its application output window 66" as a child of the displayed application window 66' and displays its application output window 66" directly over the parent window 66' drawn by the browser application 60. Since the application output window 66" drawn by the network executive 50 is a child of the application window 66' drawn by the browser application 60, the application output window 66" inherits various properties of its parent including position information. Accordingly, the application output window 66" will follow the application window 66' as the viewing user scrolls the screen of the browser application 60 or performs other actions which vary the position of the application window 66'.

The network executive 50 also establishes a communications channel with the server 34 and invokes execution of the desired application 62' by the server 34" using the connection methodology described above. The network executive 50, which acts as the client in the above description, passes any parameters it received from the parameter handler 40 instantiation to the server, along with any necessary default values. If a parameter is not passed to the server, the server may request the parameter if it is a necessary parameter which has no default value, e.g. "user id," or it may provide a default value for the parameter, e.g. execution priority. The server 34" begins execution of the desired application program 62' and directs the output to the network executive 50. The network executive 50 receives data from the application program 62' and displays the output data in its application output window 66". Since the application output window 66" is drawn on top of the application window 66' drawn by the browser application 60, the application output data is displayed in the HTML page 64'. As noted above, the application output window 66" drawn by the network executive 50 is a child of the application window 66' drawn by the browser application 60. This allows the application output window 66" to scroll as the HTML page 64' is scrolled.

The application output window 66" also receives input from the viewing user. Raw input data, e.g. a mouse click, is received into the application output window 66" by the network executive 50. The network executive 50 forwards the raw input data to the application 62' executing on the server 34". In this manner, the viewing user is able to interact with the application 62' via the HTML page 64'.

Figure 5:
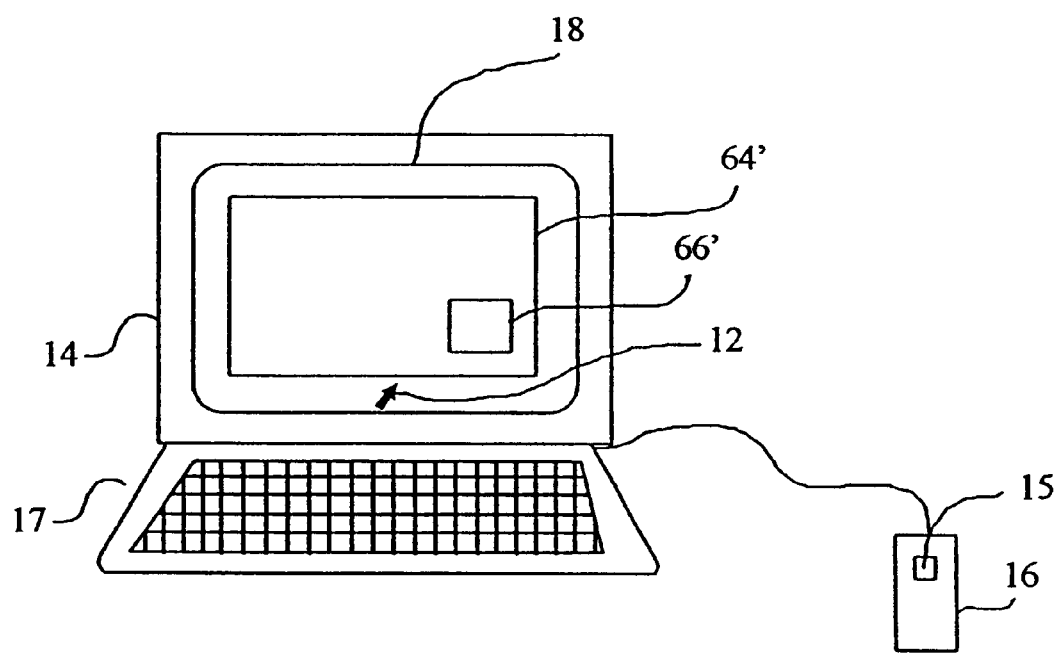
FIG. 5 is a diagrammatic view of a client node.

Referring now to FIG. 5, the viewing user uses a so-called "browser" program to display an HTML page 64' having an application window 66' on the screen 18 of the user's computer 14. The viewing user may invoke execution of an application program 62'. Typically this is done by the user utilizing a "point-and-click" interface, i.e. the viewing user uses a mouse 16 to manipulate a cursor 12 that is also displayed on the screen 18 of the viewing user's computer 14. Once the cursor 12 is over a particular portion of the HTML page 64', the viewing user signals by "clicking" a button 15 on the mouse 16. Alternatively, the viewing user may also signal by pressing a key on an associated keyboard 17, such as the "return" key. In other embodiments, the viewing user may not use a mouse 16 at all, but may instead use a touchpad, a trackball, a pressure-sensitive tablet and pen, or some other input mechanism for manipulating the cursor 12.

In another embodiment, the application window 66', or another portion of the HTIML page 64', may define a "hot zone." When the viewing user moves the cursor 12 into the "hot zone," execution of the application 62' on the server 34" is started.

Once the viewing user has indicated that execution of the application 62' should commence, the browser application 60 instantiates a parameter handler 40 and passes the instantiation parameters associated with the applications window 66' by the generic embedded window tag 66. The parameter handler 40 instance spawns a network executive 50 and passes to it the parameters of the application window 66'. The network executive 50 determines which application 62' is to be invoked, and on what server 34" that application 62' resides. Generally this information is passed to it by the parameter handler 40 instance which gets it from the browser application 60 in the form of the generic embedded window tag 66, but the network executive 50 may need to query a master network information node 40 or other various servers, in order to determine which servers, if any, host the desired application 62'. The network executive 50 then begins execution of the application and displays the output of the application program 62' in the applications window 66' as described in detail above.

The network executive 50 continues to directly display application output in the applications output window 66" until the viewing user indicates that execution of the application 62' should stop, e.g. by closing the application window 66', or until the viewing user clicks on a tag indicating that a different HTML page should be displayed. Wohen this occurs, execution of the application 62' can be terminated. It is preferred, however, is to "cache" the connection. In effect, the first parameter handler 40 instance is not immediately terminated. However, the application 62' continues executing with a reduced priority level, i.e. in "background" mode, because the first parameter handles 40 no longer has "focus".

In general, it is desirable to accomplish connection caching by providing the parameter handler 40 source code with a globally accessible data structure for registering instances. For example, the parameter handler 40 may be provided with a globally accessible linked list data structure, data array, data table, or other data structure. Because the data structure is globally available, each instance of the parameter handler 40 is able to read and write the data structure. This allows each instance of the parameter handler 40 to "register" with every other instance by writing to the data structure to signal its existence.

For embodiments in which no other connection information is stored, a predetermined limit on the number of connections that may be cached at any one time can be set. In these embodiments if registration of an instance would result in an excess number of cached connections, one of the "cached" connections is removed, i.e. the parameter handler 40 instantiation associated with that connection is notified that it should terminate. Before termination, the parameter handler 40 notifies its associated network executive 50 that it should terminate. In turn, the network executive 50 closes its session with the server hosting the application program 62' and then terminates.

In embodiments in which other information is stored, the additional information may be used to more effectively manage the cached connections. For example, if a user has not actively viewed an HTML page 64' in a predetermined number of minutes, e.g. ten minutes, the parameter handler 40 instantiation is instructed to terminate, the session with the hosting server is terminated, and the parameter handler 40 instance removes its entry in the registry.

Cached connection information may be managed using any known cache management scheme. Connection entries may be discarded on a "first in, first out" basis, i.e. the oldest entry is discarded each time a new entry must be added. Alternatively, cached connection information entries may be discarded on a "least recently used" basis, which discards information relating to connections which have been used the least amount by the user. Other cache management techniques, such as random replacement, may also be used.

If the viewing user returns to a previous HTML page 64' having a cached connection, the network executive 50 associated with the HTML page 64' is returned to the foreground, i.e., it regains "focus", and processing of the associated application resumes at a normal priority level. If necessary, the network executive 50 re-establishes the connection with the application 62'. Although no output data is stored by the network executive 50 for cached connections, as soon as a connection is re-established for an applications window 66' the connection to the application 62' is re-established and the application 10 again writes directly to the applications window 66'.

Figure 6:
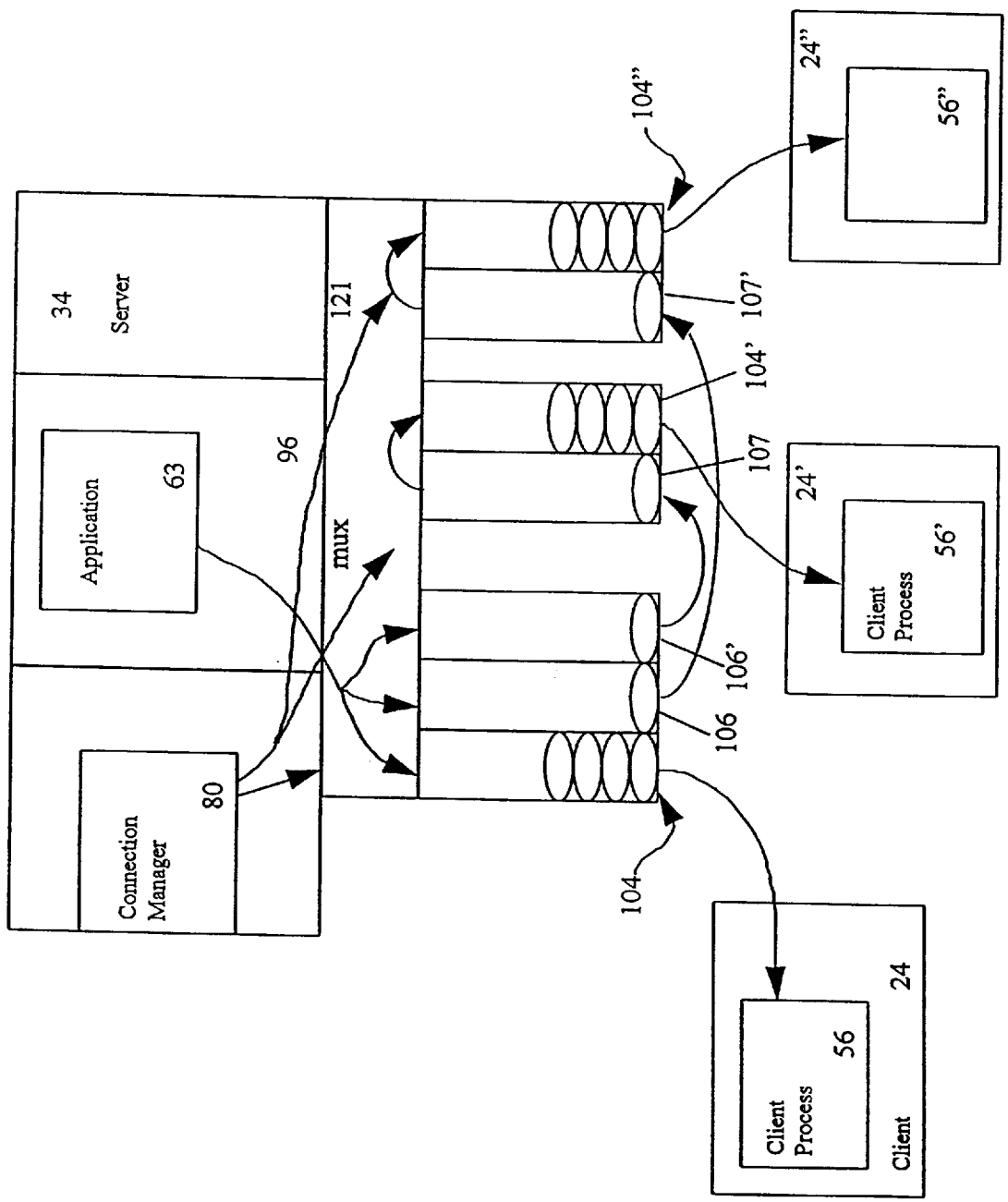
FIG. 6 is a block diagram of an embodiment of the invention depicting the use of a multiplexer to transmit the same data from an application to more than one client.

Referring to FIG. 6, it should be noted that any client 24, 24', 24", or in fact, all the clients (generally 24) attached to server 34 with the application 63 may be another server 34', 34". In this manner, data transmitted by the application 63 is sent to other servers prior to being sent to client nodes 24. In this manner, data transmitted by the application 63 is transmitted to an ever increasing number of client nodes as this network fans out.

When each client 24 terminates its connection with the server 34, each client protocol stack (generally 104) and its associated minimal stack (generally 107) is destroyed. Similarly, the minimal protocol stack (generally 106) associated with the first client protocol stack 104 is also destroyed. When the last of the minimal 107 and second (and subsequent) client protocol stacks 104 has terminated, the configuration is as it was initially with only a first client communications protocol stack 104 associated with the execution environment 96. Note that until all the second and subsequent client protocol stacks 104 are terminated, the first client protocol stack 104 may not be destroyed, even if the first client 24 is no longer present.

As shown in FIG. 2, each execution environment 96 communicates with each protocol stack 104 through a multiplexer 121, 121', 121". Now referring also to FIG. 6, with the present invention it is possible for more than one client to receive data being transmitted to the first client 24, for example, in order to shadow or monitor the transmission of data from a server 34 or to broadcast data from a specialized broadcast application, such as a stock quotation application, from which the same data is broadcast or transmitted substantially simultaneously to a number of clients (generally 24).

In such a case, the first client 24 causes the specialized application 63 to execute and transmit its data to the client 24 as discussed previously. When a second client 24' requests access to the broadcast application 63, the connection manager 80 begins to construct the protocol stack 104' for the second client 24' as previously discussed with regard to the first client 24. However, because the application 63 is a broadcast application, the connection manager 80 recognizes that it need not start an additional execution environment 96 and instead takes the steps necessary to send the data from the broadcast application 63 to the second client 24' and any additional clients 24".

First, the connection manager 80 creates a first minimal communications protocol stack 106 which it associates with a communications protocol stack 104 of the first client 24. The connection manager 80 next creates a second minimal protocol stack 107 and associates it with the communications protocol stack 104' of the second client 24'. As each additional client 24" requests access to the broadcast application 63, another minimal protocol stack 106' is created and associated with the first client protocol stack 104 and another minimal protocol stack 107' and client protocol stack 104" is created for each new client 24". The first client protocol stack 104 and all the minimal protocol stacks 106, 106' associated with the first client protocol stack 104, and each pair of client protocol stacks 104', 104" and minimal protocol stacks 107, 10' associated with each additional client 24', 24" are in communication by way of a multiplexer 121.

When multiplexer 121 is directing data to or receiving data from only one client 24, the multiplexer 121 is acting as a simple pass-through device. However, when there is more than one client 24, 24', 24" receiving data from or transmitting data to a single application 63, each multiplexer (generally 121) takes on two additional configurations. In one configuration, the multiplexer 121' is configured to send application data to or receive data from both the first client protocol stack 104 and each of the minimal communications protocol stacks 106, 106' associated with it. In the second configuration the multiplexer 121" is configured to send data received by the minimal protocol stack 107, 107' to the client protocol stack 104', 104", respectively, associated with it. In this embodiment, the mux 121 may receive input data directly from each client protocol stack 104, 104', 104".

The connection manager 80 connects the minimal protocol stacks 106, 106' associated with the first client 24 with the minimal protocol stacks 107, 107' respectively, of the second 24' and subsequent clients 24" and instructs the multiplexer 121 to direct output from the application 63 to the communications protocol stack 104 of the first client 24 and its associated minimal protocol stacks 106, 106'. The multiplexer 121 is also instructed by the connection manager 80 to connect each second and subsequent client minimal protocol stack 107, 107' to its associated client protocol stack 104', 104", respectively. Data transmitted to the first client 24 by way of the first client protocol stack 104 is therefore also transmitted to the minimal protocol stacks 106, 106' associated with the first client 24 and hence to the second 24' and subsequent clients 24" by way of their associated protocol stacks 104', 104", respectively, and associated minimal protocol stacks 107, 107', respectively. In one embodiment, the protocol stack container includes a data structure to keep track of the number and type of protocols associated with a given application 63.

Figure 7:
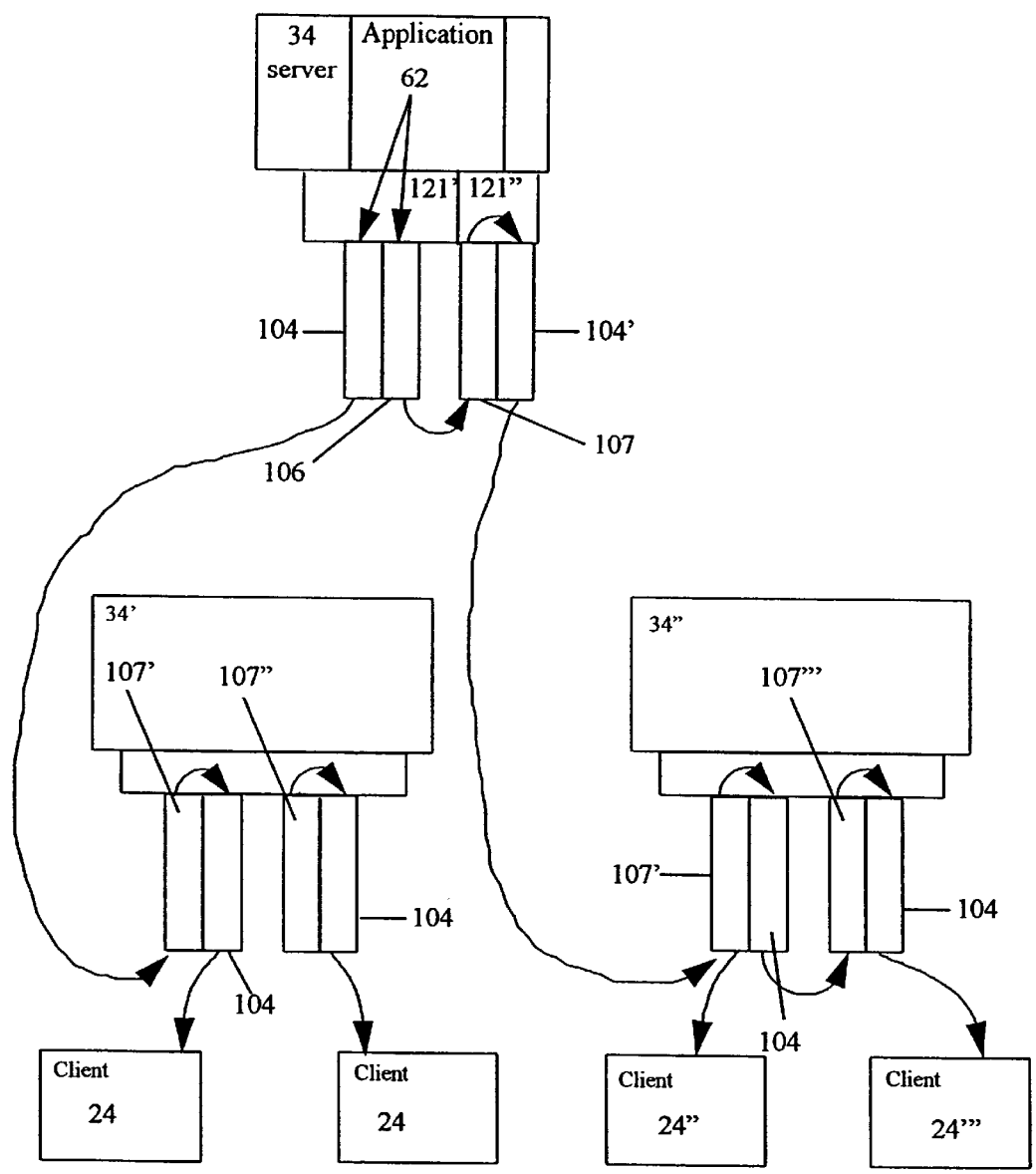
FIG. 7 is a block diagram of the embodiment of the invention in which the broadcast capabilities are increased by fan out.

Referring to FIG. 7, as discussed above, it is possible that the "clients" of one server 34 be other servers 34' and 34" (only two being shown for simplicity). The second servers 34' and 34" then transmit the data to clients (generally 24) or to additional servers. In this embodiment the output of the server protocol stack (generally 104) is connected to the protocol stacks 107' of the secondary servers 34', 34". Then as described previously, the data is transmitted between the protocol stacks and out to the clients (generally 24). In this manner the data may fan out and be distributed to many more clients than may reasonably be supported by one server.

While the invention has been particularly shown and described with reference to specific preferred embodiments, it should be understood by those skilled in the art that various changes in form and detail may be made therein departing from the spirit and scope of the invention as defined by the appended claims.

What is claimed is:

1. In a client-server network, a system for transmitting data associated with an application program to a plurality of client nodes, comprising:
    a server node executing an application program in response to a request from a first client node to execute the application program;
    a first connection between the server node and the first client node established in response to the request, the first connection including a first protocol stack on the server node for directing communications between the application program and the first client node;
    a second connection between the server node and a second client node established in response to a request from the second client node to access the application program, the second connection including a second protocol stack on the server node associated with the first protocol stack; and
    a multiplexer in communication with each connection and the application program executing on the server node, wherein the multiplexer substantially simultaneously transmits application data associated with the application program to the first and second protocol stacks.

2. The system of claim 1 wherein the application data transmitted to the second protocol stack includes a copy of the application data transmitted to the first protocol stack.

3. The system of claim 1 wherein the second connection further comprises a third protocol stack on the server node in communication with the second protocol stack, and a fourth protocol stack on the server node in communication with the third protocol stack.

4. The system of claim 1 wherein the server node further comprises an execution environment in which to execute the application program, the execution environment concurrently communicating with the first protocol stack and each protocol stack associated with the first protocol stack.

5. The system of claim 1 wherein each protocol stack includes a set of protocol modules and the set of protocol modules in the second protocol stack differs from the set of protocol modules in the first protocol stack.

6. The system of claim 1 wherein the server node is a first server node, and further comprising a second server node in communication with the first server node and the first client node, and wherein the first connection between the first client node and the first server node is through the second server node.

7. A method for communicating between an application program executing on a server node and a plurality of client nodes, the method comprising the steps of:
    executing an application program on the server node in response to a request from a first client node to execute the application program;
    establishing a first connection between the first client node and the server node in response to the request using a first protocol stack on the server node;
    establishing a second connection between a second client node and the server node using a second protocol stack on the server node in response to a request from the second client node to access the application program;
    substantially simultaneously transmitting application data associated with the application program through the first and second connections to the first and second client nodes, respectively.

8. The method of claim 7 further comprising the steps of:
    transmitting input data through one of the connections from one of the client nodes to the application program executing on the server node; and
    transmitting the input data to the other client node through the other connection.

9. The method of claim 7 wherein the application data transmitted through the second connection includes a copy of the application data transmitted to the first connection.

10. The method of claim 7 further comprising the steps of:
    generating a third protocol stack on the server node in communication with the second protocol stack; and
    generating a fourth protocol stack on the server node in communication with the third protocol stack and the second client node,
    wherein the second connection includes the third and fourth protocol stacks.

11. The method of claim 7 further comprising the steps of:
    providing an execution environment on the server node within which to execute the application program; and
    associating the execution environment with the first and second protocol stacks.

12. The method of claim 7 wherein the application program is a first application program and the second connection includes a third protocol stack on the server node, and further comprising the steps of:

executing a second application program on the server node in response to a request from the second client node to execute the second application program;

associating an execution environment for executing the second application program with the third protocol stack;

transmitting application data associated with execution of the first application program through the second and third protocol stacks of the second connection; and transmitting application data associated with execution of the second application program through the third protocol stack.

13. The method of claim 7 further comprising the steps of:

generating a new protocol stack for each additional client node requesting access to the application program executing on the server node;

associating each new protocol stack with the first protocol stack;

establishing for each new protocol stack a new connection between the application program executing on the server node and the additional client node associated with that new protocol stack; and substantially simultaneously transmitting application data associated with the application program through each new connection to each additional client node.

* * * * *